United States Patent [19]
Groll et al.

[11] Patent Number: 5,247,049
[45] Date of Patent: Sep. 21, 1993

[54] THERMOPLASTIC POLYURETHANE ELASTOMERS WITH A LOW DEGREE OF ORGANIC CARBON MIGRATION

[75] Inventors: Peter Groll, Boehl-Iggelheim; Wolfgang Straehle, Heidelberg; Herbert Mueller, Frankenthal, all of Fed. Rep. of Germany

[73] Assignee: BASF Aktiengesellschaft, Ludwigshafen, Fed. Rep. of Germany

[21] Appl. No.: 952,373

[22] Filed: Sep. 28, 1992

[30] Foreign Application Priority Data

Sep. 26, 1991 [DE] Fed. Rep. of Germany ....... 4132015

[51] Int. Cl.$^5$ ...................... C08G 18/28; C08G 18/77
[52] U.S. Cl. ........................ 128/73; 528/44; 521/155; 252/182.23; 252/182.27
[58] Field of Search ............... 528/44, 73; 521/155; 252/182.23, 182.27

[56] References Cited

U.S. PATENT DOCUMENTS 5,162,387  11/1992  Abel et al. ..................... 528/73

*Primary Examiner*—John Kight, III
*Assistant Examiner*—Duc Truong
*Attorney, Agent, or Firm*—William G. Conger

[57] ABSTRACT

The invention relates to thermoplastic polyurethane elastomers obtainable by reaction of a) unmodified and/or modified organic polyisocyanates, preferably 4,4'-diisocyanatodiphenylmethane, with b) polyoxybutylene glycols and/or polyoxybutylene-/polyoxyalkylene glycols with a molecular weight of from 150 to 1800 and a content of crown ethers, preferably those of the formula $(-CH_2CH_2CH_2CH_2O-)_m$, where m is from 3 to 6, not exceeding 0.06% of the total weight and c) chain extenders with a molecular weight of from 60 to 400, preferably 1,4-butanediol, to a process for the preparation thereof and to the use thereof for producing molded articles and sheets for use in the medical or hygiene sector and in the foodstuffs sector.

11 Claims, No Drawings

THERMOPLASTIC POLYURETHANE ELASTOMERS WITH A LOW DEGREE OF ORGANIC CARBON MIGRATION

The present invention relates to thermoplastic polyurethane elastomers, abbreviated to TPU hereinafter, which are obtained from
a) unmodified or modified organic polyisocyanates,
b) polyoxybutylene glycols and/or polyoxybutylene/polyoxyalkylene glycols with a molecular weight in the range from 150 to 1800 and a crown ether content not exceeding 0.06% of the total weight of (b), and
c) chain extenders, preferably diols, with a molecular weight of from 60 to 400, to a process for the preparation thereof and to the use thereof for producing molded articles and sheets for the medical or hygiene sector or for the foodstuffs sector.

TPU have been known for a long time. Their industrial importance is based on the combination of valuable mechanical properties with the advantages of low-cost processing. A wide range of variations in mechanical properties can be obtained by using different chemical structural components. Reviews of TPU, their properties and applications are to be found in, for example, Kunststoffe 68 (1978), 819–825, Kautschuk, Gummi, Kunststoffe 35 (1982), 568–584, or the Kunststoff-Handbuch, volume 7, Polyurethane, 2nd edition, edited by Dr. G. Oertel, published by Carl Hanser, Munich, Vienna, 1983.

TPU can be prepared continuously or batchwise by various processes. The best known processes, which are also known in industry, are the belt process and extrusion.

GB-A 1 057 018 describes the preparation, from an essentially linear polyhydroxy compound and excess organic diisocyanate, of a prepolymer which is passed by a metering pump to a mixing head and there mixed with a defined amount of a low molecular weight diol. The resulting reaction mixture is placed on a conveyor belt and passed through an oven at from 70° to 130° C. until it solidifies. The product is then comminuted, heated at up to 120° C. for from 6 to 40 hours and is then ready for processing to molded articles, for example by injection molding.

In extrusion, which is described, for example, in DE-A 20 59 570 (U.S. Pat. No. 3,642,964), the structural components are directly introduced into the extruder and the reaction is carried out therein under defined conditions. The resulting polyurethane elastomer is converted into the thermoplastic state, extruded, cooled in an inert gas atmosphere until it solidifies, and is comminuted. The disadvantage of this process is that the resulting TPU are not suitable for producing sheets or fine moldings and tubes. TPU of the same composition are transparent when produced by extrusion and opaque when produced by the belt process. Opaque TPU can be processed to sheets without blocking, whereas transparent TPU are unsuitable.

To avoid these disadvantages, DE-A 32 24 324 proposes preparing TPU at from 60° to 250° C. in two stages, the first stage entailing continuous mixing of the structural components, placing the reaction mixture on a carrier and leaving it to react partially at the relevant temperature until it has solidified, and then in the second state melting the partially reacted, solidified mixture in an extruder and completing the reaction. TPU prepared by this process have improved mechanical properties and can be processed like the products obtained by the belt process to polyurethane sheets and molded articles.

Conventional structural components, preferably difunctional structural components, can be used to prepare TPU. Examples are high molecular weight polyhydroxy compounds which form what is called the soft phase, eg. polyoxyalkylene glycols such as polyoxypropylene, polyoxyethylene, polyoxypropylene/polyoxyethylene, polyoxybutylene, polyoxybutylene/polyoxyethylene or polyoxybutylene/polyoxypropylene glycols or polyester diols such as alkanediol polyadipates, aromatic or aliphatic diisocyanates such as 4,4'-diisocyanatodiphenylmethane (MDI) or hexamethylene diisocyanate (HDI) and low molecular weight chain extenders to form the hard segments, eg. alkanediols or dialkylene glycols such as 1,4-butanediol or diethylene glycol.

It is crucially important for the use of TPU for producing molded articles or sheets for the hygiene or medical sector and in the foodstuffs sector that the contents of organic compounds which can be extracted by water in the molded articles or sheets are extremely small or zero.

Concerning the use of consumer goods made of plastic for use in association with drinking water there are plastics/drinking water recommendations of the German Board of Health, which describe the suitability of the consumer goods and the requirements to be met by them (Bundesgesundheitsblatt No. 20, January 1977 and No. 22, June 1979). The important basic requirement listed therein is the organic carbon migration, called the TOC (total organic carbon). The migration of organic carbon compounds from the plastic must, for a specific use, not exceed a fixed TOC limit on storage in water in a defined way. Accordingly, the test is carried out, for example, to measure the amounts migrating out of the relevant plastic material into the beverages. In the same way, the migration of organic carbon compounds out of the plastic is undesirable in the medical sector too.

Commercial TPU usually have unsatisfactory TOC values, irrespective of the nature of the constituents, especially of the high molecular weight polyhydroxy compounds.

TPU is therefore unsuitable, or suitable only with appropriate provisos, for specific use in the medical or hygienic sector or in the foodstuffs sector.

It is an object of the present invention to provide TPU with an improved spectrum of properties, in particular TOC values which meet the plastics/drinking water recommendation, for the production of molded articles or sheets for use in the medical or hygiene sector or the foodstuffs sector.

We have found that this object is achieved by using polyoxybutylene glycols or polyoxybutylene/polyoxyalkylene glycols with a low crown ether content as high molecular weight polyhydroxy compounds to form the soft phase in the TPU, which distinctly reduces the TOC of the TPU.

The present invention thus relates to TPU which are obtainable by reaction of
a) unmodified or modified organic polyisocyanates, preferably aromatic diisocyanates, with
b) at least one polyoxybutylene glycol, polyoxybutylene/polyoxyalkylene glycol or a mixture of polyoxybutylene and polyoxybutylene/polyoxyalkylene glycols with a molecular weight of from 150 to 1800, preferably from 250 to 1200 and c) at least one chain extender, preferably an alkanediol, with a molecular weight of from 60 to 400 and wherein the polyoxybutylene or polyoxybutylene/polyoxyalkylene glycols (b) used for this purpose have a content of not exceeding 0.06%, preferably less than 0.035% and, in particular, less than or equal to 0.02%, of the total weight of (b).

The invention also relates to a process for the preparation of the TPU as claimed in claim 5 and to the use of the TPU according to the invention for producing molded articles or sheets for use in the medical or hygiene sector or in the foodstuffs sector.

Commercial polyoxybutylene or polyoxybutylene/polyoxyalkylene glycols contain, owing to the preparation, cyclic ethers called crown ethers of the formula $(-CH_2CH_2CH_2CH_2O-)_m$, where m is usually equal to or greater than 2, preferably from 3 to 6. The concentration of these crown ethers is in the range from 0.1 to 1% by weight, depending on the preparation process and molecular weight, it being possible by special treatment methods to reduce the content thereof in the polyoxybutylene glycols or in the polyoxybutylene/polyoxyalkylene glycols to less than 0.1% by weight, preferably to approximately zero.

It has been possible by using these polyoxybutylene glycols or polyoxybutylene/polyoxyalkylene glycols which have a low or, preferably, essentially zero content of crown ethers not only to obtain TPU with very low TOC values but also to improve their processability. The mechanical properties of the products according to the invention are in the range customary for polyoxybutylene glycol TPU.

Polyoxybutylene or polyoxybutylene/polyoxyalkylene glycols with a low crown ether content thus result in a great reduction in the migration of organic carbon compounds from the TPU on storage in water.

The molded articles and sheets produced from the TPUs according to the invention are suitable, because of the low absolute TOC values, particularly for use in the medical or hygiene sector or in the foodstuffs sector.

The TPU according to the invention are prepared by reacting the structural components (a) with (b) and (c). The reaction can be carried out in the presence or, preferably, in the absence of catalysts (d) and of aids and/or additives (e).

a) Suitable and preferred organic diisocyanates (a) are aliphatic, cycloaliphatic and aromatic diisocyanates. Suitable examples are: aliphatic diisocyanates, such as hexamethylene diisocyanate, 2-methylpentamethylenediisocyanate, 2-ethylbutylene diisocyanate or mixtures of at least two of the said aliphatic diisocyanates, cycloaliphatic diisocyanates, such as isophorone diisocyanate, 1,4-diisocyanatocyclohexane, 1-methyl-2,4- and -2,6-diisocyanatocyclohexane and the corresponding mixtures of isomers, 4,4'-, 2,4'- and 2,2'-diisocyanatodicyclohexylmethane and the corresponding mixtures of isomers, and aromatic diisocyanates such as 2,4-toluylene diisocyanate, mixtures of 2,4- and 2,6-toluylene diisocyanate, 4,4'-, 2,4'- and 2,2'-diisocyanatodiphenylmethane, mixtures of 2,4' and 4,4'-diisocyanatodiphenylmethane, urethane-modified liquid 4,4'- and/or 2,4'-diisocyanatodiphenylmethane, 4,4'-diisocyanato-1,2-diphenylethane, mixtures of 4,4'-, 2,4'- and 2,2'-diisocyato-1,2-diphenylethane, advantageously those with a 4,4'-diisocyanato-1,2-diphenylethane content of at least 95% by weight, and 1,5-naphthylene diisocyanate. Preferably used are hexamethylene diisocyanate, isophorone diisocyanate, 4,4'- and/or 2,4'-diisocyanatodicyclohexylmethane and mixtures of diisocyanatodiphenylmethane isomers with a 4,4'-diisocyanatodiphenylmethane content of more than 96% by weight and, in particular, essentially pure 4,4'-diisocyanatodiphenylmethane.

The organic diisocyanates can be replaced in minor amounts, eg. in amounts up to 3 mol %, preferably up to 1 mol %, based on the organic diisocyanate, by a compound with three or more isocyanate functionalities, but the amounts of this must be limited to ensure that the polyurethanes are still thermoplastic. A larger amount of such more than difunctional isocyanates is expediently compensated by using less than difunctional compounds with reactive hydrogen atoms so that too extensive chemical crosslinking of the polyurethane is avoided. Examples of more than difunctional isocyanates are mixtures of diisocyanatodiphenylmethane and polyphenyl-polymethylene polyisocyanates, called crude MDI, and liquid isocyanurate-, urea-, biuret-, allophanate-, urethane- and/or carbodiimide-modified 4,4'- and/or 2,4'-diisocyanatodiphenylmethane.

Examples of suitable monofunctional compounds with reactive hydrogen, which can also be used as molecular weight regulators, are: monoamines such as butyl-, dibutyl-, octyl-, stearyl-, N-methylstearylamine, pyrrolidone, piperidine and cyclohexylamine, and monoalcohols such as butanol, amyl alcohol, 1-ethylhexanol, octanol, dodecanol, cyclohexanol and ethylene glycol monoethyl ether.

b) The high molecular weight polyoxyalkylene glycols (b) which are used are, as already mentioned, polyoxybutylene/polyoxyalkylene glycols, preferably polyoxybutylene/polyoxypropylene glycols, polyoxybutylene/polyoxypropylene/poloxyethylene glycols or polyoxybutylene/polyoxyethylene glycols and, in particular, polyoxybutylene glycols or mixtures of at least 2 of these polyoxyalkylene glycols with an average molecular weight Mn (number average) of from 150 to 1800 and preferably of from 250 to 1200, whose contents, according to the invention, are cyclic crown ethers of the formula $(-CH_2CH_2CH_2CH_2O-)_m$, where m is preferably from 3 to 6, does not exceed 0.06%, and is preferably less than 0.035% and in particular less than or equal to 0.02% of the total weight of (b). The number average molecular weight Mn is determined by dividing the weight of a sample by the number of molecules of which it is composed.

Polyoxybutylene and polyoxybutylene/polyoxyalkylene glycols with the low crown ether contents required according to the invention can be obtained, for example, by treatment of the products prepared by conventional processes. For this purpose they are, for example, treated with a mixture of water and a hydrocarbon, and the purified products are isolated from the aqueous phase after phase separation. Suitable processes for this are described, for example, in EP-A 0 202 487 and EP-A 0 307 811, and the statements in said patent publications are to be regarded as part of the present patent description.

c) Suitable chain extenders (c) with molecular weights of from 60 to 400, preferably 60 to 300, are alkylene glycols and, preferably, alkanediols with 2 to 12 carbons, preferably with 2, 4 or 6 carbons such as diethylene glycol, dipropylene glycol, ethanediol, 1,6-hexanediol and, in particular, 1,4-butanediol. However, diesters of terephthalic acid with alkanediols with 2 to 4 carbons are also suitable, such as those of ethylene glycol or 1,4-butanediol, and hydroxyalkyl ethers of hydroquinones, such as hydroquinone bis($\beta$-hydroxyethyl) ether.

The hardness and melt flow index can be adjusted by varying the structural components in a relatively wide range of molar ratios, the hardness and the melt viscosity increasing as the content of chain extender (c) increases, while the melt flow index decreases.

The TPU are prepared by using the polyoxybutylene and/or polyoxybutylene/polyoxyalkylene glycols (b) and diols (c) advantageously in molar ratios of from 1:1 to 1:10, preferably from 1:2.5 to 1:7, so that the resulting TPUs have a Shore 80A hardness of up to 74D.

d) The TPU according to the invention are preferably prepared without catalyst. However, to increase the rate of reaction between the NCO groups in the diisocyanates (a) and the hydroxyl groups in the structural components (b) and (c) it is possible to use the conventional tertiary amines such as triethylamine, dimethylcyclohexylamine, N-methylmorpholine, N,N'-dimethylpiperazine, diazaicyclo[2.2.2]octane and the like, as well as, in particular, organometallic compounds such as esters of titanic acid, iron compounds, tin compounds, eg. tin diacetate, tin dioctoate, tin dilaurate or the dialkyl tin salts of aliphatic carboxylic acids such as dibutyltin diacetate, dibutyltin dilaurate or the like. Where catalysts are used, they are normally employed in amounts of from 0.001 to 0.1 part per 100 parts by weight of the mixture of polyoxyalkylene glycol (b) and diols (c).

e) Besides catalysts, it is also possible to incorporate aids and/or additives (e) into the structural components. Examples are lubricants, inhibitors, stabilizers to hydrolysis, light, heat or discoloration, dyes, pigments, inorganic and/or organic fillers.

Examples of fillers are organic fillers such as carbon black and melamine and inorganic fillers such as flour, talc, amorphous silica or mixtures thereof.

Examples of suitable oxidation retarders and heat stabilizers are halides of metals of group I of the periodic table, eg. sodium, potassium and lithium halides, with or without copper(I) halides, eg. chlorides, bromides or iodides, sterically hindered phenols, hydroquinones, and substituted compounds of these groups and mixtures thereof, which are preferably used in concentrations up to 1% of the weight of the TPU.

Examples of UV stabilizers are various substituted resorcinols, salicylates, benzotriazoles and benzophenones, and sterically hindered amines, which are generally employed in amounts up to 2.0% of the weight of the TPU.

Mold release agents which are usually likewise added in amounts up to 1% of the weight of the TPU are stearic acid, stearyl alcohol, esters and amides of stearic acid, and the fatty acid esters of pentaerythritol.

It is also possible to add organic dyes such as nigrosin, pigments, eg. titanium dioxide, cadmium sulfide, cadmium sulfide selenide, phthalocyanines, ultramarine blue or carbon black.

Details of other aids or additives (e) which are not specifically described can be found in the specialist literature, for example the Monograph by J. H. Saunders and K. C. Frisch "High Polymers", volume XVI, Polyurethane, part 1 and 2 (published by Interscience Publishers 1962 and 1964), the Kunststoff-Handbuch, volume 7, Polyurethane, 1st and 2nd edition, (published by Carl Hanser, 1966 and 1983) or DE-A 29 01 774.

The aids and/or additives (e) can be introduced into the structural components or into the reaction mixture for preparing the TPU. In another variant, the aids (e) and/or additives can, however, be mixed with the TPU and subsequently melted.

To prepare the TPU, the structural components (a), (b) and (c) are reacted, in the presence or absence of catalysts (d) and of aids and/or additives (e), in amounts such that the ratio of equivalents of NCO groups of the diisocyanates to the total of the hydroxyl groups of components (b) and (c) is from 0.80 to 1.20:1, preferably from 0.95 to 1.05:1 and, in particular, about 1:1.

The TPU according to the invention can be prepared by extrusion or, preferably, by the belt process by batchwise or continuous mixing of the structural components (a) to (c), with or without (d) and/or (e), allowing the reaction mixture to react completely in the extruder or on a conveyor belt at from 60° to 250° C., preferably from 70° to 150° C., and subsequently granulating the resulting TPU. It may be expedient to heat the resulting TPU, before further processing to the TPU molding compositions according to the invention, at from 80° to 120° C., preferably from 100° to 110° C., for from 1 to 24 hours.

As already mentioned, the TPU are preferably prepared by the belt process. For this, the structural components (a) to (c), with or without (d) and/or (e), are continuously mixed with the aid of a mixing head at temperatures above the melting point of structural components (a) to (c). The reaction mixture is loaded onto a carrier, preferably a conveyor belt, eg. made of metal, and passed at a rate of from 1 to 20 m/minute, preferably from 4 to 10 m/minute, through a heated zone which is from 1 to 20 m, preferably from 3 to 10 m, long. The temperature in the heated zone is from 60° to 200° C., preferably from 80° to 180° C. Depending on the diisocyanate content in the reaction mixture, the reaction is controlled by cooling or heating so that at least 90%, preferably at least 98%, of the isocyanate groups in the diisocyanates are reacted, and the reaction mixture solidifies at the chosen temperature. The presence of free isocyanate groups in the solidified reaction product, which comprise from 0.05 to 1%, preferably from 0.1 to 0.5%, of the total weight, means that the resulting TPU have a relatively low melt viscosity and a high melt flow index.

The resulting TPU can, for example, be stored in the form of granules or processed directly by conventional methods, eg. by injection molding or extrusion, to molded articles or sheets.

The molded articles and sheets are particularly suitable for use in the medical or hygiene sector, eg. as catheters, infusion bags, tubes, in diapers, and in the foodstuffs sector as drinking cups, packaging material and pipelines for, for example, beverages of all types.

EXAMPLE 1

1500 g of a polyoxybutylene glycol containing no crown ether and with a molecular weight of 1000 were degassed at 110° C. under 5 mbar for 1 hour. Then 187.5 g of 1,4-butanediol were added with stirring, and the clear solution was heated to 70° C. While stirring vigorously (1000 rpm), a solution of 4,4'-MDI in an amount corresponding to an NCO number of 101.5 (909.5 g), heated to 65° C., was added.

When the reaction temperature of 120° C. was reached, the homogeneous mixture was poured onto a hot plate lined with Teflon-coated glass fiber fabric, with the dimensions 550×380 mm. After about 2 minutes, the hot crude TPU was comminuted and then heated at 100° C. in a drying oven for 15 hours. The TPU was then converted into granules 4 to 6 mm in size in a granulator, and these were processed in a screw injection molding machine to test specimens in the form of disks with a diameter of 60 mm and a thickness of 2 mm.

EXAMPLE 2

The process of Example 1 was carried out but using a polyoxybutylene glycol with a crown ether content of 0.05% by weight.

COMPARATIVE EXAMPLES I to V

The process of Example 1 was carried out to prepare TPU with the NCO number 101.5 using the following commercial polyoxybutylene glycols:

| Comp. Ex. | Commercial product | Molecular weight | Crown ether content[1] [% by weight] |
|---|---|---|---|
| I | Poly THF 1000 (BASF AG) | 1000 | 0.1 |
| II | Poly THF 2000 (BASF AG) | 2000 | 0.15 |
| III | Terathane ® 1000 (Du Pont) | 1000 | 0.48 |
| IV | Terathane ® 2000 (Du Pont) | 2000 | 0.55 |
| V | Polymeg ® 1000 (Quaker Oats) | 100 | 0.38 |

[1]According to analysis by gas chromatography (GC)

Determination of the organic carbon migration by the method in Bundesgesundheitsblatt 20/22 (1977/1979)
TOC=total organic carbon
DOC=dissolved organic carbon
Determination of TOC from measurements of DOC
Test specimens:
3 TPU disks (60 mm×2 mm) per measurement
Total surface area 182 cm$^2$
Preparations:
 All glass apparatus rinsed out with chromic acid
 Glass apparatus rinsed with deionized water
 Glass apparatus stored in deionized water for 3 days
 Test specimens placed without contact in the sample vessel (1000 ml)
 Test specimens completely wetted, without bubbles, with deionized water (182 ml)
 Blank
 Duplicate determinations
Measurement periods:
 1st measurement after 3 days→renew test water
 2nd measurement after a further 3 days→renew test water
 3rd measurement after a further 3 days
DOC measurement:
Apparatus: supplied by Maihak
Method:
The test water is metered into the reaction vessel containing dilute sulfuric acid, and first the inorganic carbon (carbonate) is driven out in the form of carbon dioxide.

The organic compounds are subsequently broken down in a stream of oxygen while irradiating with a low pressure Hg lamp (254 nm). Further carbon dioxide formed is detected.
Detector:
Non-dispersive infrared detector (NDIR), set at 4250 nm (carbon dioxide)
Comparative solution:
Potassium hydrogen phthalate solution (German Board of Health Recommendation: oxalic acid solution)

| | Results of the TOC tests | | |
|---|---|---|---|
| | TOC (mg/m$^2$ × day) | | |
| TPU prepared in | after 3 days | after 6 days | after 9 days |
| Example 1 | 30.9 | 15.6 | 13.4 |
| Example 2 | 32.4 | 20.6 | 14.2 |
| Comp. Ex. | | | |
| I | 40.7 | 26.9 | 19.9 |
| II | 46.0 | 42.7 | 26.5 |
| III | 80.9 | 50.4 | 39.3 |
| IV | 127.7 | 96.0 | 69.4 |
| V | 62.5 | 42.1 | 33.5 |

Particularly suitable TPU within the scope of the invention for use in the medical or hygiene sector or in the foodstuffs sector are those which have a TOC of less than or equal to 15 mg/m$^2$×day after a 3-day contact, which should be repeated twice. The assessment is based on the TOC values in the last contact test.

The mechanical properties of the TPU prepared in Example 1 and Comparative Examples III and V were as follows:

| TPU of | | Ex. 1 | Comp. Ex. III | Comp. Ex. V |
|---|---|---|---|---|
| Hardness (specification) | | 85A | 85A | 85A |
| Tear strength (N/mm$^2$) | | 44.2 | 43.8 | 38.2 |
| Elongation at break (%) | | 524 | 558 | 511 |
| K | | 68.5 | 71.3 | 76.0 |
| Shore A/D | | 87A | 86-87A | 87A |
| Notched impact strength +23° C. | | 0 | 0 | 0 |
| (% failure/kJ/m$^2$) | 0° C. | 0 | 0 | 0 |
| | −20° C. | 0 | 0 | 0 |
| | −40° C. | 0 | 0 | 0 |
| Izod test | −23° C. | 0 | 0 | 0 |
| (% failure/kJ/m$^2$) | 0° C. | 0 | 0 | 0 |
| | −20° C. | 0 | 0 | 0 |
| | −40° C. | 0 | 0 | 0 |
| Penetration test | +23° C. | 0/81 | 0/99 | — |
| (% failure/Nm) | 0° C. | 0/108 | 0/101 | 0/113 |
| | −20° C. | 0/86 | 0/88 | 0/79 |
| | −40° C. | 0/81 | 0/81 | 0/76 |

The results show that the TPU have essentially the same chemical properties, irrespective of the crown ether content in the polyoxybutylene glycols used.

We claim:

1. A thermoplastic polyurethane elastomer comprising the reaction product of
   a) unmodified or modified organic polyisocyanates with
   b) polyoxybutylene glycols, polyoxybutylene/polyoxyalkylene glycols or mixtures thereof with a molecular weight in the range from 150 to 1800 and
   c) chain extenders with a molecular weight of from 60 to 400 wherein the polyoxybutylene/polyoxyalkylene glycols (b) have a content of crown ethers exceeding 0.06% of the total weight.

2. A thermoplastic polyurethane elastomer comprising the reaction product of
   a) 4,4'-diisocyanatodiphenylmethane with
   b) at least one polyoxybutylene glycol, one polyoxybutylene/polyoxyalkylene glycol or a mixture of these polyoxyalkylene glycols with a molecular weight in the range from 150 to 1800 and a content of crown ethers not exceeding 0.06% of the total weight, and
   c) 1,4-butanediol.

3. A thermoplastic polyurethane elastomer as claimed in any one of claims 1 or 2, wherein the cyclic crown ethers have the formula $$(-CH_2CH_2CH_2CH_2O-)_m$$

m is from 3 to 6.

4. A process for preparing thermoplastic polyurethane elastomers by reaction of
   a) unmodified or modified organic polyisocyanates with
   b) polyoxybutylene glycols, polyoxybutylene/polyoxyalkylene glycols or mixtures thereof with a molecular weight in the range from 150 to 1800 and
   c) chain extenders with a molecular weight of from 60 to 400
in the presence or absence of
   d) catalysts and
   e) aids and/or additives
wherein the polyoxybutylene glycols or polyoxybutylene/polyalkylene glycols (b) have a content of crown ethers not exceeding 0.06% of the total weight.

5. A process as claimed in claim 1, wherein the thermoplastic polyurethanes are prepared by extrusion.

6. A process as claimed in claim 4, wherein 4,4'-diisocyanatodiphenylmethane is used as organic polyisocyanate (a).

7. A process as claimed in claim 4, wherein the polyoxybutylene glycol (b) has a molecular weight of from 250 to 1200 and a content of crown ethers of the formula $(-CH_2CH_2CH_2CH_2O-)_m$, where m is from 3 to 6, not exceeding 0.035% of the total weight.

8. A process as claimed in claim 4, wherein the chain extender (c) is 1,4-butanediol.

9. The process of using thermoplastic polyurethane elastomers comprising the reaction product of
   a) unmodified or modified organic polyisocyanates with
   b) polyoxybutylene glycols, polyoxybutylene/polyoxyalkylene glycols or mixtures thereof with a molecular weight in the range from 150 to 1800 and
   c) chain extenders with a molecular weight of from 60 to 400
for the production of molded articles or sheets for use in the medical or hygiene sector or in the foodstuffs sector.

10. The process of using thermoplastic polyurethane elastomers comprising the reaction product of
    a) 4,4'-diisocyanatodiphenylmethane with
    b) polyoxybutylene glycols with a molecular weight in the range from 150 to 1800 and a content of crown ethers not exceeding 0.06% of the total weight, and
    c) 1,4-butanediol.
for the production of molded articles or sheets for use in the medical or hygiene sector or in the foodstuffs sector.

11. A process as claimed in claim 4, wherein the thermoplastic polyurethanes are prepared by the belt process.

* * * * *